US008496276B2

(12) United States Patent
Kaminsky, Jr.

(10) Patent No.: US 8,496,276 B2
(45) Date of Patent: Jul. 30, 2013

(54) LOCKING SYSTEM FOR VEHICLE DOOR

(76) Inventor: Robert Joseph Kaminsky, Jr., Homer Glen, IL (US)

( * ) Notice: Subject to any disclaimer, the term of this patent is extended or adjusted under 35 U.S.C. 154(b) by 761 days.

(21) Appl. No.: 12/586,882

(22) Filed: Sep. 29, 2009

(65) Prior Publication Data
US 2011/0072865 A1    Mar. 31, 2011

(51) Int. Cl.
*E05C 3/06* (2006.01)
(52) U.S. Cl.
USPC ............... 292/216; 292/288; 292/DIG. 23
(58) Field of Classification Search
USPC ............... 292/216, 1, 288, DIG. 23; 70/56, 70/54, 203, 211, 212, 417, DIG. 65
See application file for complete search history.

(56) References Cited

U.S. PATENT DOCUMENTS

| | | |
|---|---|---|
| 716,118 A | 12/1902 | Scott |
| 3,151,898 A * | 10/1964 | Olander ........................ 292/1 |
| 3,652,114 A | 3/1972 | Cady et al. |
| 3,905,638 A | 9/1975 | Persico |
| 3,996,774 A | 12/1976 | Best |
| 4,506,527 A | 3/1985 | Grill |
| 4,581,907 A * | 4/1986 | Eberly ........................... 70/54 |
| 4,938,041 A | 7/1990 | O'Gara |
| 5,172,574 A | 12/1992 | Perfetto |
| 5,174,135 A | 12/1992 | Loughlin |
| 5,669,255 A | 9/1997 | Albano |
| 5,819,561 A | 10/1998 | Blehi, III |
| 6,854,303 B2 | 2/2005 | Shiao et al. |
| 7,290,415 B2 | 11/2007 | Rosenberg et al. |
| 7,562,546 B2 | 7/2009 | Taylor |
| 7,610,784 B2 | 11/2009 | Rohde et al. |
| 7,770,422 B1 | 8/2010 | Sierra |
| 2004/0011092 A1 | 1/2004 | Haczynski et al. |
| 2005/0252257 A1 | 11/2005 | Woods et al. |
| 2008/0105005 A1 | 5/2008 | Wang |

FOREIGN PATENT DOCUMENTS

FR    2031828 A5    11/1970

OTHER PUBLICATIONS

International Search Report for PCT/US2010/045119.

* cited by examiner

*Primary Examiner* — Carlos Lugo
*Assistant Examiner* — Mark Williams
(74) *Attorney, Agent, or Firm* — Wood, Phillips, Katz, Clark & Mortimer

(57) ABSTRACT

The combination of an over-the-road vehicle and a locking system. The vehicle has a frame bounding a cargo space and at least one access door. The one door has a first latch assembly thereon that cooperates with a second latch assembly on one of: a) the vehicle frame; and b) a second door to releasably maintain the one door in its closed position. The locking system includes a first locking assembly on the first door and a second locking assembly on the one of the vehicle frame and second door. The first and second latch assemblies are secured to the vehicle using fasteners. The first and second locking assemblies are secured to the vehicle using these same fasteners. The first and second locking assemblies can be maintained together either inside or outside of the cargo space.

21 Claims, 4 Drawing Sheets

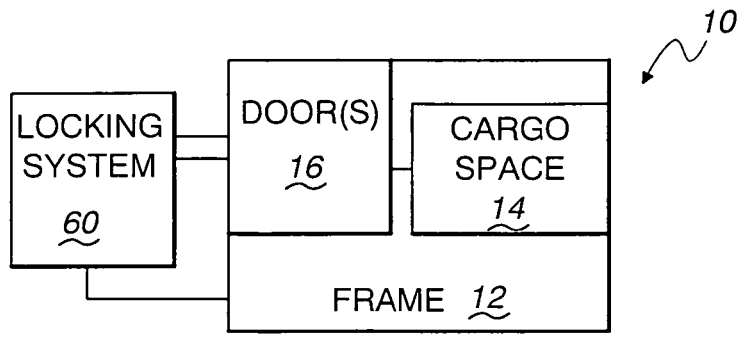
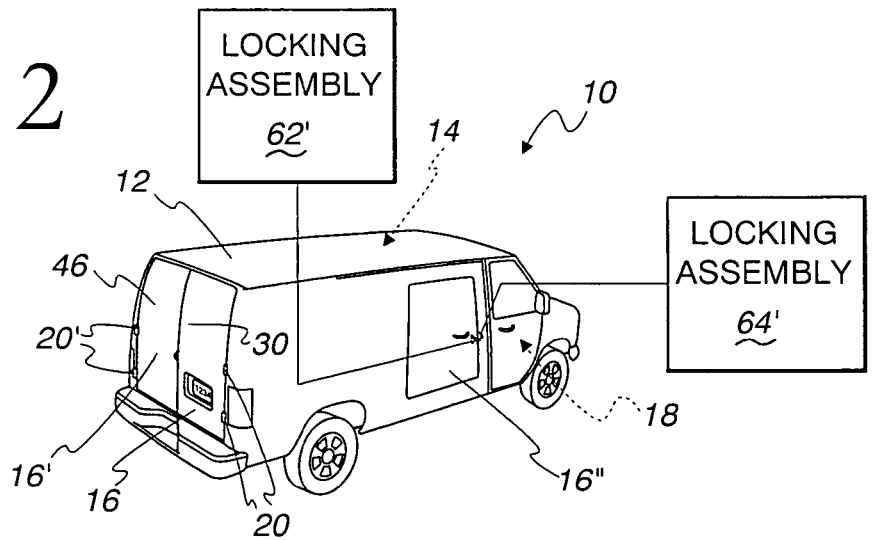
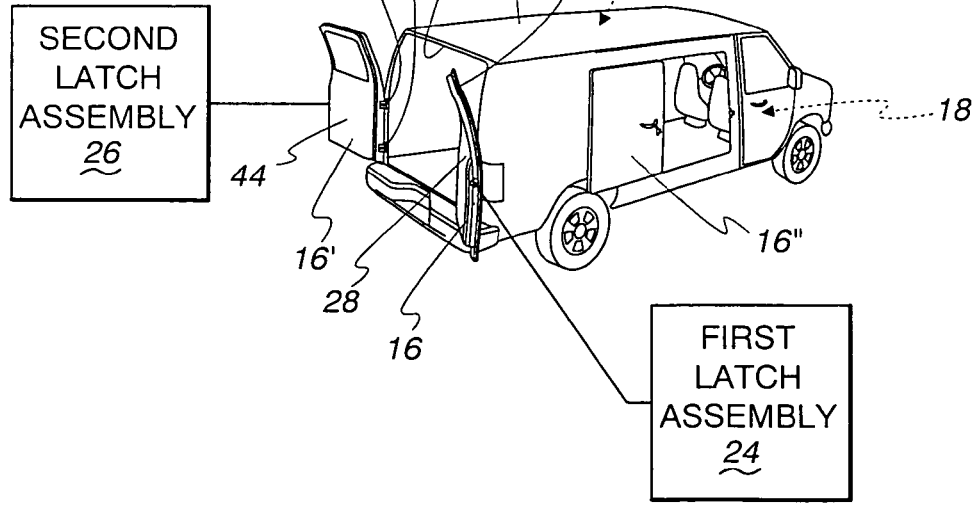

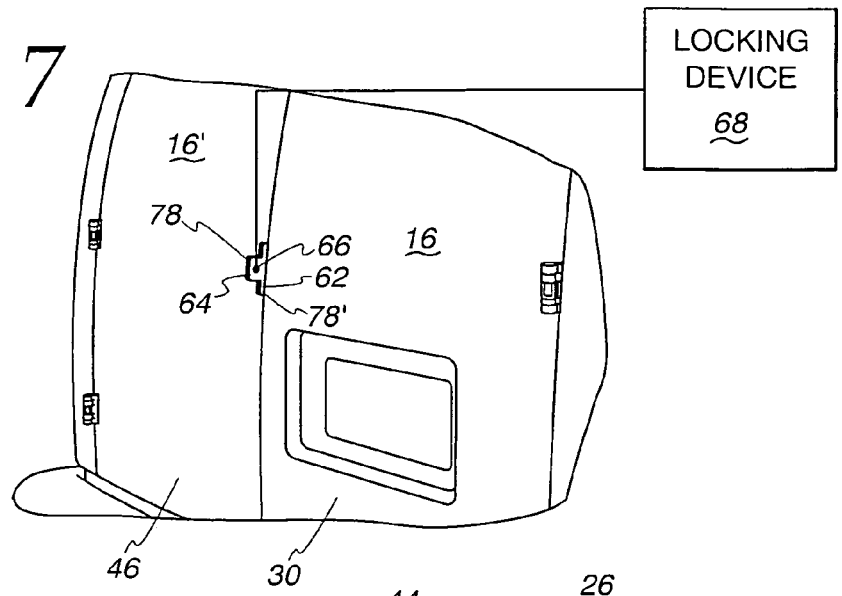
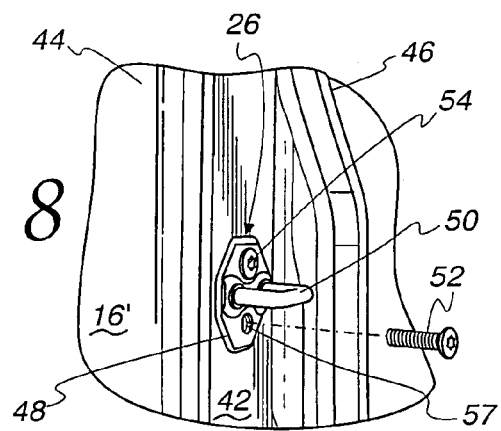
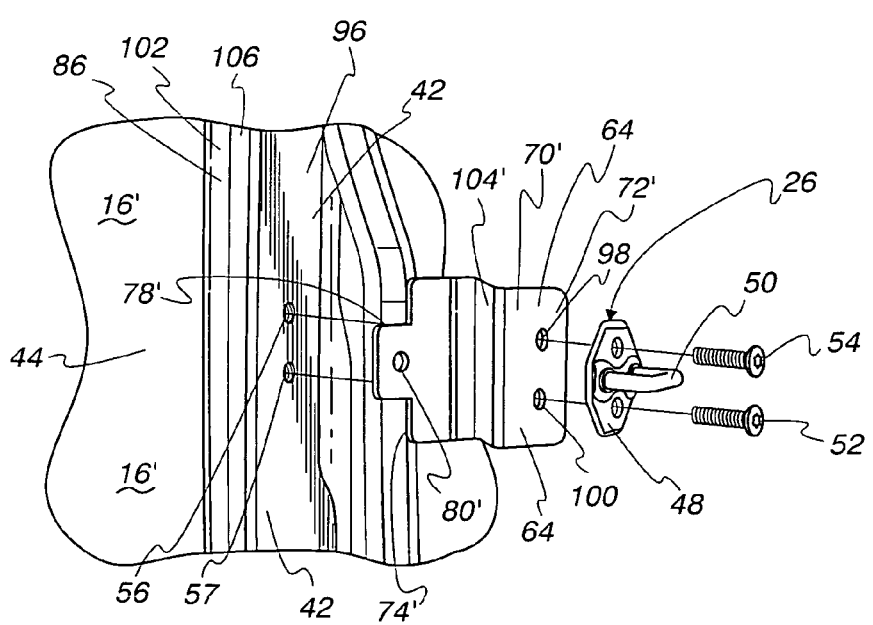

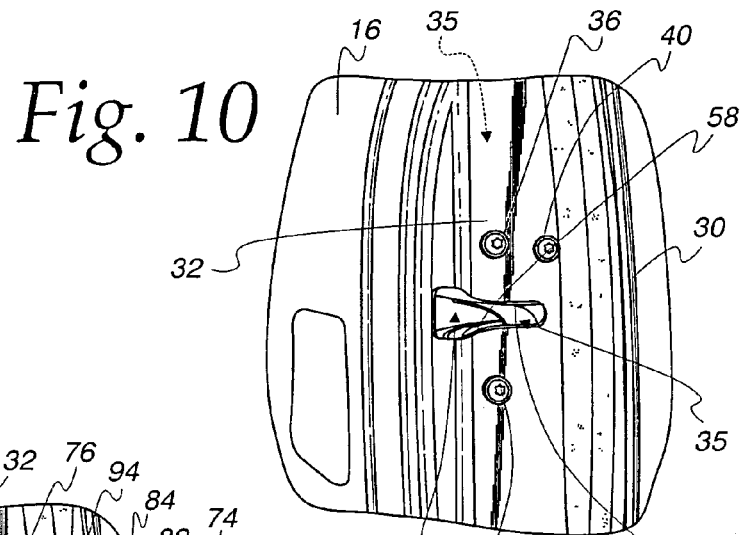
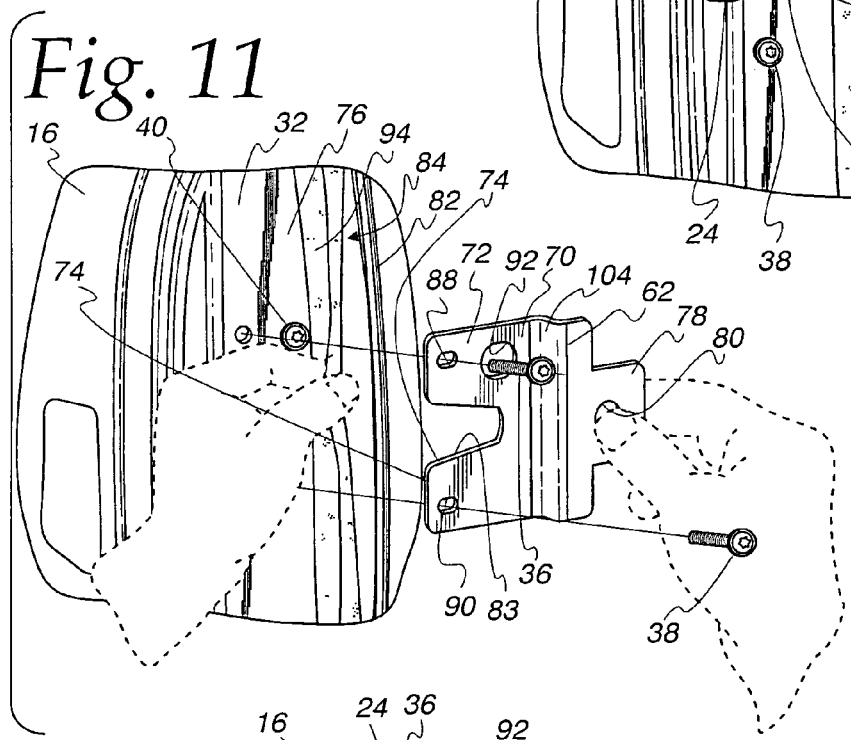
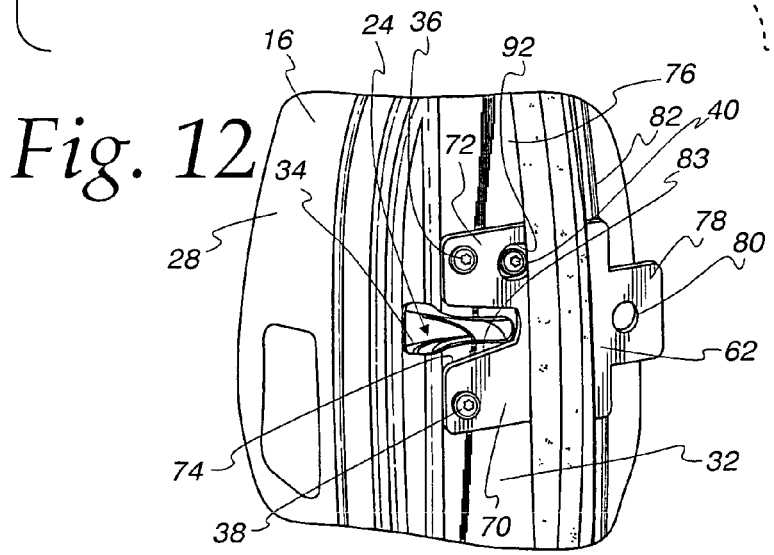

LOCKING SYSTEM FOR VEHICLE DOOR

BACKGROUND OF THE INVENTION

1. Field of the Invention

This invention relates to over-the-road vehicles and, more particularly, to a locking system that secures an access door on such a vehicle.

2. Background Art

Vans are one of the most commonly used vehicles by those in the trades. Vans are desirable because they afford a large cargo space, yet are small enough that they afford a convenient means to move personnel, tools and supplies from one job to the next.

In a typical van construction, rear access to the cargo space is gained through oppositely hinged doors. Side access may be gained through a like arrangement of doors and/or through one or more sliding doors. By selectively repositioning these doors, a large access opening is exposed to facilitate introduction and removal of potentially large objects and/or a significant quantity of smaller objects.

By reason of being able to accommodate large quantities of goods, these vans are often targeted by thieves. This problem is aggravated by the fact that the van often carries the identity of a commercial entity, whereby the nature of the cargo therewithin becomes apparent to an onlooker.

Typically, these vans are manufactured so that the primary barrier to entry through each door is a keyed latching arrangement. As an example, at the back region of the van, one of the cooperating back doors may have a strike bolt thereon and be maintained in a closed position through interiorly operated locks. The other door has a latch mechanism, that may include one or more rotors, that engage the strike bolt with the doors in a closed position. Through a key, the latch mechanism can be placed selectively in locked and released states. Similar mechanisms may be provided on side doors.

Thieves are often adept at quickly picking the above types of locks. In a relatively short time frame, a thief can gain access to the cargo space and abscond with potentially expensive cargo.

The above problems prompted the development of auxiliary locking systems. One such system is made up of plate members that are bolted to the exterior surfaces of doors where they meet with the doors in a closed position. A "hockey puck" is then secured to the adjacent plate members on the closed doors. The "hockey puck" is key operated and preferably situated to block access to the conventional key cylinder which operates the primary lock mechanism. The "hockey pucks" are typically made with a hardened and robust construction that makes them difficult to defeat. To gain access to the cargo space, a would-be thief has to both defeat the "hockey puck" and thereafter pick the factory installed lock to gain access to the cargo space.

In another form, a conventional type hasp is mounted to the cooperating doors at the exterior surface thereof. A conventional padlock can be used with this latter system to secure the doors.

The latter system has significant vulnerability by reason of the fact that the components are exposed, whereby they might be pried apart using readily available tools. It is known with the former to avoid such action by placing the "puck" within a framed recess that blocks access in a manner whereby the "puck" might be pried from its secured position.

While generally the above types of systems have been effective in deterring theft, they both have some significant drawbacks. Most notably, each such system requires external mounting of plates on each of the doors in a cooperating, hinged door pair and on a door and cooperating frame with a sliding door arrangement. Each of these exteriorly mounted components is commonly secured in place through bolts that are directed into bores drilled directly through the exposed surfaces on the vehicle.

The components mounted in this manner are often unsightly. This is aggravated by the fact that they are prone to rusting, depending upon the nature of the material from which they are made. Additionally, by drilling through the exposed and painted metal on the vehicle itself, additional locations are created at which rust has a tendency to generate. If appropriate steps are not taken, water may also migrate to within the doors and vehicle frame.

In the event that such vehicles are sold, it is always possible that a subsequent purchaser will not wish to maintain the auxiliary locking systems in place, for whatever reason. If the auxiliary locking systems are removed, the mounting locations may need to be repaired, which could require patching and painting through a potentially expensive process.

Further, such auxiliary locking systems generally incorporate relatively expensive components. Any plates and mounting bolts are generally made from hardened material, as is the "puck" described above.

Heretofore, those installing auxiliary locking systems have contended with the above problems. This has been a result of the fact that viable alternative and/or auxiliary systems are not currently available. The industry continues to seek out systems that can be readily incorporated into vehicles, are affordable to purchase and install, cause the least amount of damage to a vehicle, and are effective in terms of obstructing entry to the vehicles.

SUMMARY OF THE INVENTION

In one form of the invention, a combination is provided made up of an over-the-road vehicle and a locking system. The vehicle has a frame bounding a cargo space and at least one door that is movable between closed and open positions to selectively block and allow access to the cargo space. The at least one door has a first latch assembly thereon that cooperates with a second latch assembly on one of: a) the vehicle frame; and b) a second door to releasably maintain the first door in its closed position. The locking system is made up of a first locking assembly on the first door and a second locking assembly on the one of the vehicle frame and second door. The first and second latch assemblies are secured to the vehicle using fasteners. At least one of the first and second locking assemblies is secured to the vehicle using the same fasteners. The first and second locking assemblies cooperate to be maintained together, either inside or outside of the cargo space, to thereby prevent the first door in its closed position from being moved into its open position.

In one form, the first and second locking assemblies cooperatively define an opening into which a locking device can be directed from either inside or outside of the cargo space. The first door has an inside, an outside, and a first peripheral edge. The first locking assembly is secured to the first door by a plurality of the fasteners that are directed through the first peripheral edge to secure the first latch assembly to the first door.

In one form, the second latch assembly is on the second door. The second door has an inside, an outside, and a second peripheral edge. The second locking assembly is secured to the second door by a plurality of the fasteners that are directed through the second peripheral edge to secure the second latch assembly to the second door.

In one form, the first and second locking assemblies respectively comprise first and second plates with first and second fully surrounded openings that align at a location either inside or outside of the first and second doors to accept a locking device with the first and second doors in their closed positions.

In one form, the combination includes a padlock that defines the locking device.

In one form, the second latch assembly is on the vehicle frame. The vehicle frame has an inside, an outside, and a peripheral edge extending around the access opening. The second locking assembly is secured to the vehicle frame by a plurality of. the fasteners that are directed through the peripheral edge on the frame to secure the second latch assembly to the vehicle frame.

In one form, the first and second locking assemblies respectively comprise first and second plates with first and second fully surrounded openings that align at a location either inside or outside of the cargo space to accept a locking device with the first door in its closed position.

In one form, the first door has a gasket on the first peripheral edge and the first plate resides between the first peripheral edge and the gasket.

In one form, the first peripheral edge has a flat surface and the first plate has a body with a main section with a flat surface that facially engages the flat surface on the first peripheral edge.

In one form, the body on the first plate has an offset extension in which the first fully surrounded opening is formed.

In one form, the body is defined by a substantially flat piece of stock material that is bent to define the offset extension.

In one form, the fasteners are threaded fasteners.

In one form, the first peripheral edge has a flat surface and the first plate has a body with a main section with a flat surface that facially engages the flat surface on the first peripheral edge.

In one form, the first and second locking assemblies respectively consist of first and second plates that cooperatively produce an opening at a location either inside or outside of the cargo space to accept a locking device with the first door in the closed position.

In one form, the first and second plates respectively consist of first and second bodies with substantially the same overall shape.

The invention is further directed to a method of preventing a first door on an over-the-road vehicle from moving from a closed position into an open position. The vehicle has a frame bounding a cargo space, with the first door selectively movable between the closed and open positions to thereby block and allow access to the cargo space. The first door includes a first latch assembly that cooperates with a second latch assembly on one of: a) the vehicle frame; and b) a second door to releasably maintain the first door in its closed position. The method includes the steps of: removing at least one fastener that maintains the first latch assembly on the first door; providing a first locking assembly; with the at least one fastener attaching the first locking assembly to the first door; placing the first door in the closed position; providing a locking device; and with the first door in the closed position, connecting the locking device to the first locking assembly and to another part of the vehicle to thereby maintain the first door in the closed position.

In one form, the method further includes the step of removing at least a second fastener that maintains the second latch assembly on the one of the vehicle frame and second door. A second locking assembly is provided. With at least a second fastener the second locking assembly is attached to the one of the vehicle frame and second door using the at least second fastener. The method further involves connecting the locking device to the first and second locking components to thereby maintain the first door in the closed position.

In one form, the steps of providing first and second locking assemblies involve providing first and second locking assemblies that cooperatively define at least one opening that is at a location either inside or Outside of the cargo space.

BRIEF DESCRIPTION OF THE DRAWINGS

FIG. 1 is a schematic representation of an over-the-road vehicle with the inventive locking system incorporated to maintain at least one door in a closed position;

FIG. 2 is a perspective view of one specific form of vehicle with the inventive locking system incorporated and with three separate doors shown in a closed position;

FIG. 3 is a view as in FIG. 2 with each of the three doors in an open position;

FIG. 7 is a view as in FIG. 6 with the particular locking device removed and with a generic form of locking device depicted;

FIG. 8 is an enlarged, fragmentary, perspective view of the latch assembly on one of the doors in FIGS. 6 and 7 and with one of the fasteners holding the latch assembly in place removed;

FIG. 9 is a view as in FIG. 8 showing an exploded arrangement of the latch assembly in FIG. 8 and a locking assembly that is captively held between the latch assembly and door;

FIG. 10 is an enlarged, fragmentary, perspective view of the latch assembly on the door that cooperates with the latch assembly on the door in FIGS. 8 and 9;

FIG. 11 is a view as in FIG. 10 wherein the latch assembly, which cooperates with the latch assembly in FIG. 9, is being installed on the door in FIG. 10; and FIG. 12 is a view as in FIG. 11 with the locking assembly secured in place.

DETAILED DESCRIPTION OF THE PREFERRED EMBODIMENT

Figure 4:
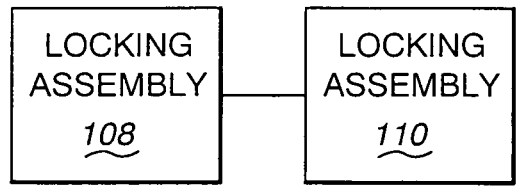
FIG. 4 is a schematic representation of cooperating components making up the inventive locking system.

An over-the-road vehicle is shown at 10 in FIG. 1. The vehicle 10 is shown schematically as it is intended to encompass virtually a limitless number of different vehicle configurations. The vehicle 10 has a frame 12 surrounding a cargo space 14. The frame 12 supports at least one door 16 that is movable between closed and open positions to selectively block and allow access to the cargo space 14. Each door 16 is mounted to the frame 12 for movement between its open and closed positions through various different mechanisms, as by translation or through a pivoting action.

One more specific, exemplary form of the over-the-road vehicle 10 is shown in FIGS. 2 and 3 as a conventional van. The frame 12 on the vehicle 10 defines a passenger compartment 18 behind which the cargo space 14 is located.

At the rear of the vehicle 10, first and second doors, 16, 16' are provided and are each connected to the frame 12 by hinges 20, 20' for pivoting movement between closed positions, as shown in FIG. 2, and open positions as shown in FIG. 3. With one or more of the doors 16, 16' in their open position, access to the cargo space 14 can be gained through a framed access opening 22. With the doors 16, 16' in their closed positions, access to the cargo space 14 is blocked by the doors 16, 16'.

The first door 16 has a first latch assembly 24 that cooperates with a second latch assembly 26 on the second door 16' so as to releasably maintain the first and second doors 16, 16' in their closed positions. In FIG. 3, the latch assemblies 24, 26 are shown in schematic form since the particular details of construction are not critical to the present invention. There are currently myriad latch assembly constructions being used on cooperating vehicle doors to releasably maintain the doors in their closed positions.

The first door 16 has an inside 28, an outside 30, and a peripheral edge 32 between surfaces at the inside 28 and outside 30. The first latch assembly 24 consists of a module 34 that is mounted within a space 35 between the inside 28 and outside 30 of the door 16. The module 34 is secured to the door 16 through multiple, and in this case three, fasteners 36, 38, 40. The nature of the fasteners is not critical to the present invention. In this embodiment, each of the fasteners 36, 38, 40 is threaded and directed through the peripheral door edge 32 into the module 34.

The second latch assembly 26 on the second door 16' is mounted on a peripheral edge 42 thereon between surfaces on the inside 44 and outside 46 of the door 16'. The second latch assembly 26 consists of a strike assembly with a mounting plate 48 and a U-shaped strike element 50 secured thereto.

The second latch assembly 26 is secured to the door 16' by a plurality of, and in this case two, threaded fasteners 52, 54 that are directed through the peripheral edge 42 into fixed, threaded anchoring sockets 56, 57.

With the door 16' in its closed position, the door 16 can be moved from its open position into its closed position, whereupon the strike element 50 moves through a slot 58 in the door 16 into engagement with the module 34 to thereby be releasably held. As noted above, the details of construction for the module 34 are not critical to the present invention. One or more rotors might be used to cooperate with the strike element 50 in conventional fashion. This latched condition may be maintained by a conventional locking mechanism, that is not shown in the drawings herein. The locking mechanism may be key actuated and/or actuated from within the cargo space 14.

Releasing of the latch assemblies 24, 26 from each other allows at least the door 16, and potentially both doors 16, 16', in the event the door 16' is not separately locked from the inside of the cargo space 14, to be moved to their open positions.

To prevent at least the first door 16 from being moved from its closed position into its open position, as in the event unauthorized release of the latch assemblies 24, 26 is effected, a locking system is provided at 60, as shown schematically in FIG. 1. The locking system 60 could be the primary locking system or an auxiliary locking system that provides security in the event that the aforementioned locking mechanism fails or is defeated, whereupon the latch assemblies 24, 26 can be separated from each other. The locking system 60 is shown in one specific, exemplary form in FIGS. 2, 3 and 6-12.

Figure 6:
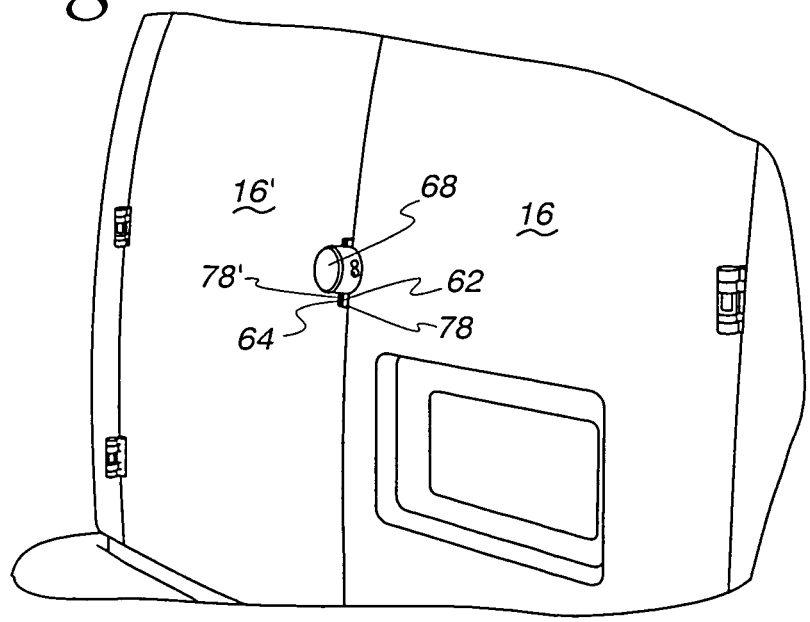
FIG. 6 is an enlarged, fragmentary, perspective view of the rear of the vehicle in FIGS. 2 and 3 with the doors each in a closed position and with a locking device secured to the cooperating locking assemblies.

The locking system 60 consists of a first locking assembly 62 on the first door 16 and a second locking assembly 64 on the second door 16'. The first and second locking assemblies 62, 64 are respectively mounted to the peripheral edges 32, 42 of the doors 16, 16' in a manner whereby with the doors 16, 16' in their closed positions, as shown in FIGS. 2, 6 and 7, an opening 66 is defined cooperatively by the locking assemblies 62, 64 through which a locking device 68 can be directed, thereby to maintain the locking assemblies 62, 64 together. In this state, neither of the doors 16, 16' can be moved from its closed position into its open position.

The locking assemblies 62, 64 are preferably secured to their respective doors 16, 16' without structurally modifying the doors 16, 16', other than by addition. More specifically, the locking assembly 62 is secured to the door 16 using the fasteners 36, 38. The locking assembly 62 is in the form of a plate with a body 70 having a main section 72 with a flat surface 74 that facially engages a flat surface 76 on the door peripheral edge 32.

The body 70 has an offset extension 78 with a fully surrounded through opening/bore 80. In one preferred form, the body 70 is defined by a substantially flat piece of stock material that is bent to define the configuration shown with the main section 72 and offset extension 78.

The extension 78 is offset to allow the body 70 to project from the peripheral edge 32 outwardly so that the opening 80 is exposed at a location on the outside of the cargo space 14. With this configuration, the body 70 is allowed to wrap around an edge 82 on the door 16 that projects laterally beyond the flat surface 76 on the peripheral edge 32. Through this arrangement, a lip portion 84, terminating at the edge 82, overlies a complementary seat 86 on the door 16', with the doors 16, 16' in their closed positions. An opening 83 is formed in the body 70 and aligns over the door slot 58 to allow passage of the strike element 50 through the door slot 58 without interference from the body 70.

The body 70 has three additional pre-formed openings/bores 88, 90, 92 that preferably centrally register with the axes of the fasteners 36, 38, 40, respectively. The body 70 is held in place by the fasteners 36, 38 that are used to secure the module 34 to the door 16.

By turning and thereby removing the fasteners 36, 38, these same fasteners 36, 38 can be directed through the openings/bores 88, 90, respectively, to captively secure the body 70 against the peripheral edge 32. With the fasteners 36, 38 removed, the fastener 40 maintains the module 34 fixed in its initial operative position, whereby the fasteners 36, 38 can be readily re-threaded thereinto.

The bore 92 is made to loosely surround the fastener 40 which is not removed or re-used during the assembly process.

In this door construction, a gasket 94 is mounted at the peripheral edge 32 adjacent to the lip portion 84. During the assembly process for the plate 70, the gasket 94 can be locally separated, slightly away from the remainder of the door 16, to allow the body 70 to be directed between the gasket 94 and peripheral edge 32, as shown in FIG. 11.

The second locking assembly 64 is also in the form of a plate with a body 70' consisting of a main section 72' with a flat surface 74' to be placed facially against a flat surface 96 on the peripheral edge 42 on the door 16'. The body 70' is bent from the main section 72' to define an offset extension 78'. The extension 78' has a fully surrounded opening/bore 80'.

The body 70' is mounted to the door 16' using the existing fasteners 52, 54. More specifically, the fasteners 52, 54 are turned to be removed, thereby allowing separation of the second latch assembly 26, consisting of the mounting plate 48 and strike element 50.

The body 70' has openings/bores 98, 100 that centrally align, one each with the threaded anchoring sockets 56, 57, into which the fasteners 52, 54 are threaded. The body 70 can thus be mounted to be positively captively held between the mounting plate 48 and the flat surface 96 on the peripheral edge 42. The offset extension 78' extends to outside of the door 16'. With the doors 16, 16' in their closed positions, the openings/bores 80, 80' register/align to produce the combined opening 66 that accepts the locking device 68.

The bodies 70, 70' have substantially the same overall configuration, with the exception that the, bores/openings therein are different in number, size, and location. The offset extensions 78, 78' on the bodies 70, 70' are oppositely bent. With the body 70, the offset extension 78 is designed to wrap around the edge 82 on the door 16. On the door 16', the offset extension 78' resides adjacent a wall portion 102 that is laterally offset from the peripheral edge 42.

A transition region 104 on the body 70, between the main section 72 and offset extension 78, is situated to bear against the lip portion 84 to confine rearward shifting of the body 70 and thereby reinforce the connection of the body 70. The corresponding transition region 104' on the body 70' is confined against forward movement by a facing, forwardly offset surface 106, thereby reinforcing the connection of the body 70'.

While the precise details of the same will not be described hereinbelow, a similar arrangement of locking assemblies 62', 64' may be provided on a door 16" that is translated between a closed position, as shown in FIG. 2, and an open position, as shown in FIG. 3. The locking assemblies 62', 64' are integrated, using existing fasteners (not shown) on cooperating latch assemblies (not shown) on the door 16" and frame 12. With this construction, the locking assemblies 62', 64' cooperate in the same manner as the locking assemblies 62, 64 cooperate to prevent translation of the door 16' from its closed position.

The locking device 68 may take any of a number of different forms, as shown schematically in FIG. 7. In one form, the locking device 68 is in the form of a padlock. Any element that can be directed through the opening 66 and secured against separation will functional adequately.

In FIG. 6, the locking device 68 is shown as a conventional "hockey puck" that can be placed over the adjacent extensions 78, 78', as shown in the FIG. 7 state, to allow a key operated element (not shown) to be extended through the opening 66.

While the locking assemblies 62, 64 are shown to be of a construction such that the opening 66 is provided outside of the cargo space 14, the generic showing in FIG. 1 is intended to encompass a modified construction wherein the extensions 78, 78' project to a location within the cargo space 14 to accept a locking device 68 installed therein.

As shown in FIG. 4, the invention contemplates that the cooperating locking assemblies 62, 64, 62', 64' might be modified significantly from the form shown for the preferred embodiments. The schematic showing of the locking assemblies 108, 110 in FIG. 4 is intended to encompass virtually any cooperating locking assemblies that can be installed without a substantial alteration of the associated doors and that cooperate in any manner to allow their interconnection, either inside or outside of the cargo space 14, to thereby prevent opening of at least one associated door. As just one example, it is not necessary that the locking assemblies 108, 110 have fully surrounded openings/bores to accept a locking device; or that the locking assemblies 108, 110 be in a plate form, as shown for the preferred embodiments. The cooperating locking assemblies 108, 110 may have integrally formed structure through which they are maintained together without any separate locking device.

Figure 5:
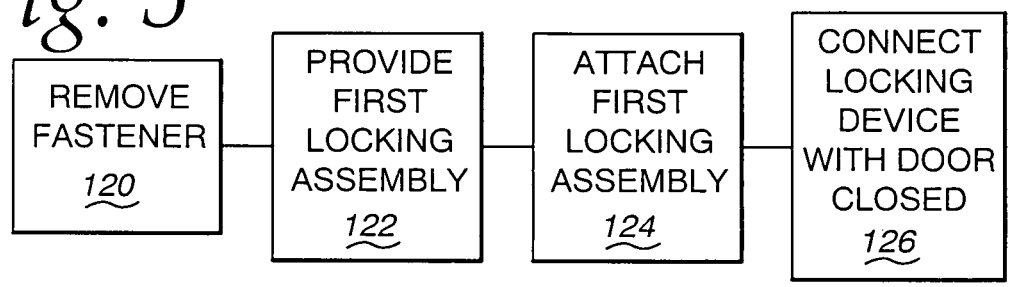
FIG. 5 is a flow diagram representation of a method of preventing a door from being moved from a closed position into an open position, according to the invention.

With the inventive structure, an existing over-the-road vehicle 10 can be retrofit with the locking system 60. The retrofitting method, as shown schematically in FIG. 5, involves the step of removing at least one fastener that maintains a first latch assembly on the first door, as shown at block 120. As shown at block 122, a first locking assembly is provided. As shown at block 124, the at least one removed fastener is used to attach the first locking assembly to the first door. As shown at block 126, a locking device is connected to the first locking assembly and to another part of the vehicle with the door in a closed position, thereby to maintain the first door in the closed position.

The second locking assembly may be installed in a like fashion using existing fasteners.

The locking system 60 may be made up of locking assemblies that have a generic construction capable of adapting to different vehicle models. Alternatively, the locking assemblies may be customized to a particular model and/or make of vehicle.

The openings/bores in the locking assemblies that receive the fasteners may be enlarged/elongated to be certain that the fasteners can be aligned with, and directed into, the appropriate threaded receptacle(s) on vehicle latch assembly components.

The locking assembly parts may be made from a hardened metal material so that they are not prone to being cut or otherwise altered to defeat the locking system.

The foregoing disclosure of specific embodiments is intended to be illustrative of the broad concepts comprehended by the invention.

The invention claimed is:

1. In combination:
a) an over-the-road vehicle comprising a frame bounding a cargo space and at least one door that is movable between closed and open positions to selectively block and allow access to the cargo space,
the at least one door comprising a first door that has oppositely facing inside and outside surfaces and a peripheral edge between the inside and outside surfaces, the first door having a first latch assembly thereon that cooperates with a second latch assembly on one of: a) the vehicle frame; and b) a second door to releasably maintain the first door in its closed position,
wherein the first latch assembly is secured to the vehicle using at least one fastener; and
b) a locking system comprising a first locking assembly on the first door and a second locking assembly on the one of the vehicle frame and second door,
the first locking assembly secured to the first door using at least the one fastener,
the secured first and second locking assemblies cooperating to be maintained together either inside or outside of the cargo space to thereby prevent the first door in its closed position from being moved into its open position,
wherein the one fastener is directed through the peripheral edge and secures the first locking assembly and first latch assembly to the first door.

2. The combination according to claim 1 wherein the first and second locking assemblies cooperatively define an opening into which a locking device can be directed from either inside or outside of the cargo space.

3. The combination according to claim 2 wherein the second latch assembly is on the second door, the second door has an inside, an outside, and a second peripheral edge between surfaces at the inside and outside of the second door and the second locking assembly is secured to the second door by a plurality of fasteners that are directed through the second peripheral edge to secure the second latch assembly to the second door.

4. The combination according to claim 3 wherein the first and second locking assemblies respectively comprise first and second plates with first and second fully surrounded openings that align at a location either inside or outside of the first and second doors to accept a locking device with the first and second doors in their closed positions.

5. The combination according to claim 4 in combination with a padlock that defines the locking device.

6. The combination according to claim 4 wherein the first door has a gasket on the first peripheral edge and the first plate resides between the first peripheral edge and the gasket.

7. The combination according to claim 4 wherein the first peripheral edge has a flat surface and the first plate has a body with a main section with a flat surface that facially engages the flat surface on the first peripheral edge.

8. The combination according to claim 7 wherein the body on the first plate has an offset extension in which the first fully surrounded opening is formed.

9. The combination according to claim 8 wherein the body is defined by a substantially flat piece of stock material that is bent to define the offset extension.

10. The combination according to claim 2 wherein the second latch assembly is on the vehicle frame, the vehicle frame having an inside, an outside, and a peripheral edge between surfaces at the inside and outside of the vehicle frame and extending around the access opening and the second locking assembly is secured to the vehicle frame by a plurality of the fasteners that are directed through the peripheral edge on the frame to secure the second latch assembly to the vehicle frame.

11. The combination according to claim 10 wherein the first and second locking assemblies respectively comprise first and second plates with first and second fully surrounded openings that align at a location either inside or outside of the cargo space to accept a locking device with the first door in its closed position.

12. The combination according to claim 11 wherein the first and second plates respectively comprise first and second bodies with substantially the same overall shape.

13. The combination according to claim 12 wherein the first and second latch assemblies are secured to the vehicle using a plurality of fasteners including the at least one fastener and the first and second bodies each has a plurality of openings to receive the fasteners and the openings in the first plate are different than the openings in the second plate in terms of at least one of number, size, and location.

14. The combination according to claim 10 wherein the first peripheral edge has a flat surface and the first plate has a body with a main section with a flat surface that facially engages the flat surface on the first peripheral edge.

15. The combination according to claim 10 wherein the first and second locking assemblies respectively comprise first and second plates that cooperatively produce an opening at a location either inside or outside of the cargo space to accept a locking device with the first door in the closed position.

16. The combination according to claim 1 wherein the at least one fastener comprises a threaded fastener.

17. The combination according to claim 1 wherein the first door is movable between its open and closed positions one of: a) in translation; and b) through a pivoting action.

18. In combination:
a) an over-the-road vehicle comprising a frame bounding a cargo space and at least one door that is movable between closed and open positions to selectively block and allow access to the cargo space, are secured to the second door by at least one fastener that is directed through the second peripheral edge, wherein the second locking assembly comprises a plate that is captive between the second latch assembly and the second peripheral edge.

19. In combination:
a) an over-the-road vehicle comprising a frame bounding a cargo space and at least one door that is movable between closed and open positions to selectively block and allow access to the cargo space,
the at least one door comprising a first door that has oppositely facing inside and outside surfaces and a peripheral edge between the inside and outside surfaces, the first door having a first latch assembly at the peripheral edge that cooperates with a second latch assembly on one of: a) the vehicle frame; and b) a second door to releasably maintain the first door in its closed position,
the first latch assembly secured to the vehicle using at least one fastener; and
b) a locking system comprising a first locking assembly on the first door and a second locking assembly on the one of the vehicle frame and second door,
the first locking assembly secured to the first door at the peripheral edge using at least the one fastener extending into the first door without extending through the outside surface of the first door,
the secured first and second locking assemblies cooperating to be maintained together either inside or outside of the cargo space with the first door in its closed position to thereby prevent the first door in its closed position from being moved into its open position.

20. In combination:
a) an over-the-road vehicle comprising a frame bounding a cargo space and at least one door that is movable between closed and open positions to selectively block and allow access to the cargo space,
the at least one door comprising a first door that has oppositely facing inside and outside surfaces and a peripheral edge between the inside and outside surfaces, the first door having a first latch assembly thereon that cooperates with a second latch assembly on one of: a) the vehicle frame; and b) a second door to releasably maintain the first door in its closed position,
wherein a part of the peripheral edge is defined by a first wall portion,
wherein the first latch assembly is secured to the vehicle using at least one fastener; and
b) a locking system comprising a first locking assembly on the first door and a second locking assembly on the one of the vehicle frame and second door,
the first locking assembly secured to the first door using at least the one fastener,
the secured first and second locking assemblies cooperating to be maintained together either inside or outside of the cargo space to thereby prevent the first door in its closed position from being moved into its open position,
one of a) the first wall portion; b) the first latch assembly; and c) the first locking assembly held by the first fastener captively between the other two of: a) the first wall portion; b) the first latch assembly; and c) the first locking assembly.

21. In combination:
a) an over-the-road vehicle comprising a frame bounding a cargo space and at least one door that is movable between closed and open positions to selectively block and allow access to the cargo space,
the at least one door comprising a first door that has oppositely facing inside and outside surfaces and a first peripheral edge between the inside and outside surfaces, the first door having a first latch assembly thereon that cooperates with a second latch assembly on one of: a) the vehicle frame; and b) a second door to releasably maintain the first door in its closed position, the one of the vehicle frame and second door having a second peripheral edge between inside and outside surfaces, b) a locking system comprising a first locking assembly secured on the first door and a second locking assembly secured on the one of the vehicle frame and second door, at least one of the first and second locking assemblies secured to the vehicle using at least a first fastener, the secured first and second locking assemblies cooperating to be maintained together either inside or outside of the cargo space to thereby prevent the first door in its closed position from being moved into its open position, wherein the first fastener is directed into one of: a) the first locking assembly, the first latch assembly and the first door at the first peripheral edge; and b) the second locking assembly the second latch assembly and the one of i) the vehicle frame and ii) the second door at the second peripheral edge to either: A) secure the first locking assembly and first latch assembly to the first door; or B) secure the second locking assembly and second latch assembly to the one of: i) the vehicle frame and ii) the second door.

* * * * *

UNITED STATES PATENT AND TRADEMARK OFFICE
CERTIFICATE OF CORRECTION

PATENT NO.         : 8,496,276 B2
APPLICATION NO.    : 12/586882
DATED              : July 30, 2013
INVENTOR(S)        : Robert Joseph Kaminsky, Jr.

It is certified that error appears in the above-identified patent and that said Letters Patent is hereby corrected as shown below:

In the Claims

Column 9, line 61 - Column 10, line 3, Claim 18 should read

-- 18. In combination:

a) an over-the-road vehicle comprising a frame bounding a cargo space and at least one door that is movable between closed and open positions to selectively block and allow access to the cargo space,
the at least one door comprising a first door that has oppositely facing inside and outside surfaces and a first peripheral edge between the inside and outside surfaces, the first door having a first latch assembly thereon that cooperates with a second latch assembly on one of: a) the vehicle frame; and b) a second door to releasably maintain the first door in its closed position,
wherein the first and second latch assemblies are secured to the vehicle using fasteners; and b) a locking system comprising a first locking assembly on the first door and a second locking assembly on the one of the vehicle frame and second door, the first locking assembly secured to the first door using at least a first one of the fasteners,
the first and second locking assemblies cooperating to be maintained together either inside or outside of the cargo space to thereby prevent the first door in its closed position from being moved into its open position,
wherein with the first door in its closed position the first and second locking assemblies cooperatively define an opening into which a locking device can be directed from either inside or outside of the cargo space,
wherein the first fastener is directed through the first peripheral edge and secures each of the first latch assembly and first locking assembly to the first door,
wherein the second latch assembly is on the second door,
wherein the second door has oppositely facing inside and outside surfaces and a second peripheral edge and the second locking assembly and second latch assembly are secured to the second Signed and Sealed this
Eleventh Day of February, 2014

Michelle K. Lee
*Deputy Director of the United States Patent and Trademark Office* door by at least one fastener that is directed through the second peripheral edge, wherein the second locking assembly comprises a plate that is captive between the second latch assembly and the second peripheral edge. --